United States Patent Office 2,862,960
Patented Dec. 2, 1958

2,862,960
PROCESS FOR PREPARING ALPHA-CHLORO-ACRYLIC COMPOUNDS

Maxwell A. Pollack, Morris Plains, N. J.

No Drawing. Application January 16, 1956
Serial No. 559,113

12 Claims. (Cl. 260—486)

This invention relates to a method of producing alpha-haloacrylic acid, its homologs, and various derivatives. The invention is particularly useful in connection with the chloro-compounds in the form of esters. It will be illustrated, therefore, principally by description in connection therewith. Thus methyl alpha-chloroacrylate, for example, is produced from methyl alpha-beta-dichloropropionate by an economical process giving yields of 90% or so of the desired product.

The application is a continuation in part of application for patent, Serial No. 276,242, filed by me on March 12, 1952, and now abandoned.

Esters of alpha-chloroacrylic acid have economic importance largely because of their polymerizability to form polymers of high molecular weight. For example, methyl alpha-chloroacrylate polymerizes readily to form polymethyl alpha-chloroacrylate, which is a very strong and hard glass-like plastic, whose superiority over the present commercially-used polymethyl methacrylate may be demonstrated by the following data:

|  | Polymethyl chloroacrylate | Polymethyl methacrylate |
|---|---|---|
| Tensile strength, p. s. i. | 16,000–17,000 | 9–10,000. |
| Rockwell hardness | 115–118 | 97–100. |
| Heat distortion temp., ° C. | 130–135 | 90–95. |
| Flammability | Self-extinguishing | Burns. |
| Crazing resistance | Excellent | Crazes readily. |

Despite their evident utility, the chloroacrylate polymers have not been used in commerce to a significant extent, largely because of lack of a satisfactory method for producing the monomeric ester in high yield and purity and in large scale, commercial size equipment. Efforts have been made to produce chloroacrylic esters from alpha-beta-dichloropropionic esters by treatment with solid alkalies, aqueous solutions of organic acid salts, or organic tertiary bases. These have one or both of the serious shortcomings of being too expensive and using a two-phase reaction system which is difficult to apply and control on a large scale.

As to dechlorination of the alpha-beta-dichlorocompound with acid catalyst, it was to have been expected either that both halogens would be taken off simultaneously or that the alpha chlorine atom would have been preferentially removed. U. S. Patent 2,013,648 to Barrett shows that chlorine is removed (as HCl) from the methyl ester of chloropropionic acid when the chlorine is in the alpha position but not when in the beta. Barrett used the acidic catalyst, ferric chloride. By using sulfuric acid and taking certain precautions, I obtained an opposite result. I removed the beta in preference to the alpha halogen and left the alpha in position. It was necessary, however, for satisfactory results, to remove the alpha-chloroacrylic esters as formed, thus avoiding further contact with the surfuric acid, all as described in my said copending application.

I have now discovered a process of dehydrohalogenation which proceeds very rapidly and smoothly to the desired chloroacrylic ester and stops at that point. In this process, it is unnecessary to remove the ester as formed. Indeed the ester may be held in direct contact with the acidic catalyst for a long time without objectionable reaction.

This method is illustrated by the treatment of esters of alpha-beta-dichloropropionic acid with ion exchange resins of the sulfonic acid type. Examples are the styrene-divinylbenzene copolymer sulfonic acids such as Amberlite IR–120 and Dowex–50. The resins, if in the form of salts, are adjusted in advance to the acid cycle, as by acidification with hydrochloric or sulfuric acid and then washing out excess of the said acid with water. Contact of these materials, hot with the dichloro compound, forms and volatilizes hydrogen chloride and leaves the corresponding ester of alpha-chloroacrylic acid.

A typical reaction is as follows:

$$CH_2Cl \cdot CHCl \cdot COOCH_3 \xrightarrow[\text{heat}]{\text{Amberlite}} CH_2{:}CHCl \cdot COOCH_3 + HCl$$

Briefly stated, this invention comprises the process of dehydrohalogenation of alpha-beta-dihalopropionic acid, its homologs, and their derivatives, such as esters, nitriles, amides, and acyl halides, by heating them with a sulfonic acid until approximately one molecule of hydrogen halide is removed per molecule of ester.

One embodiment of this process involves mixing methyl alpha-beta-dichloropropionate with a styrene-divinylbenzene copolymer sulfonic acid or other sulfonic acid in a kettle and heating the mixture under a reflux condenser whereby hydrogen chloride gas is permitted to escape and the product, methyl alpha-chloroacrylate, is retained in the kettle.

In another embodiment, the styrene-divinylbenzene copolymer sulfonic acid or other sulfonic acid compound insoluble in the compound to be dehydrochlorinated is supported in a heated vertical column or cracking tower. Methyl alpha-beta-dichloropropionate is allowed to flow into this column. Hydrogen chloride gas is formed and is led off at the top, while a mixture of methyl alpha-chloroacrylate and unreacted methyl alpha-beta-dichloropropionate is collected at the bottom. This mixture is then introduced into a heated vertical fractionating column whereby methyl alpha-chloroacrylate is collected as a distillate and unreacted methyl alpha-beta-dichloropropionate is drawn off at the bottom and is returned to the cracking tower containing the catalyst. In this way, a continous process is provided.

In still another embodiment, the styrene-divinylbenzene copolymer sulfonic acid catalyst is supported in a tube maintained at a temperature above the boiling point of methyl alpha-beta-dicholoropropionate. This latter chemical is vaporized and passed into the tube as a gas which traverses the catalyst and is thereby converted into a mixture of methyl alpha-chloroacrylate and hydrogen chloride. The issuing gases are cooled to condense the desired methyl alpha-chloroacrylate and any unconverted dihalo compound, while allowing the hydrogen chloride to escape.

Various esters of alpha-beta-dichloropropionic acid may be treated by my process, such as the alkyl esters, including the methyl, ethyl, propyl, butyl, amyl, n-hexyl, octyl, lauryl, and octadecyl esters. Similarly, the corresponding alkenyl esters such as the allyl, crotyl, oleyl, or chloroallyl esters may be so treated to form the corresponding unsaturated esters of alpha-chloroacrylic acid. Also I may use the polyhydric esters such as the glycol, glycerol, and mannitol esters. Other esters that I may use are the aryl, heterocyclic, cycloparaffinic, and the like esters of which examples are phenyl, cresyl, chlorophenyl, resorcinyl, naphthyl, benzyl, fenchyl, cyclohexyl, and thienyl esters.

In addition, other derivatives of alpha-beta-dichloropropionic acid are used to form the corresponding alpha-chloroacrylic derivative. These other derivatives that may be used include alpha-beta-dichloropropionic acid itself, its amides, acyl halides, and nitrile. Examples in addition to the nitrile are materials of the type formula $CH_2Cl \cdot CHCl \cdot CO \cdot R$ in which R represents Cl, Br, or I; or $NH_2$, $NH(CH_3)$, or $N(C_4H_9)_2$.

In place of the alpha-beta-dichloropropionic acid compounds, I may use homologs of the various types of compounds described. Thus I may use compounds of the formula given above in which one or more hydrogen atoms on the beta carbon are replaced by monovalent hydrocarbon groups such as alkyl, aryl, aralkyl and alkaryl groups. Examples of these groups are methyl, ethyl, and propyl; phenyl; cresyl, xylyl, and tetrahydronaphthyl; and benzyl, phenylethyl, and phenylbutyl.

As the acid catalyst for effecting the dehydrohalogenation, I use one selected from a very limited class, namely a sulfonic acid. Examples of this class that are effective for the purpose of giving a high yield of the desired alpha-halo compound are polystyrene sulfonic acids, styrene-divinylbenzene copolymer sulfonic acids, phenol-formaldehyde resin sulfonic acids, polyethylene sulfonic acids, asphalt sulfonic acids, polybutadiene sulfonic acids, coumarone-indene resin sulfonic acids, "mahogany" sulfonic acids, dodecanesulfonic acid, methanesulfonic acid, cyclohexanesulfonic acid, naphthalene disulfonic acid, phenolsulfonic acid, toluenesulfonic acid, beta-naphthalene sulfonic acid, oleic sulfonic acid, alkoxysulfonic acid such as ethoxysulfonic acid, and chlorosulfonic acids. A large variety of acidic catalysts, other than sulfonic acids, have been tried without success in my simplified process.

When the sulfonic acid catalyst is to be used in the form of particles in a column or by other technique in which the catalyst remains in solid form, the catalyst should be insoluble, that is, difficultly soluble at the most in the compound to be dehydrochlorinated.

As to proportions, I use in the batch process at least 0.1% and ordinarily 1%–25% of the selected sulfonic acid catalyst on the weight of the dichloro compound to be dehydrohalogenated.

In the continuous process, in which the dihalo compound to be partly dehydrohalogenated is passed over the sulfonic acid compound in granular form, time of contact and temperature rather than proportions are the controlling factors. The rate of flow of the dichloro compound and the height of column and suitably both are so established that, at the elevated temperature of contact, approximately 1 mole of hydrochloric acid is formed by the passage of the said compound over the granules. It will be understood that the sulfonic material may be used over and over again.

In the batch process, on the other hand, the dichloro compound is agitated with about 1–25 parts of the sulfonic acid material for 100 of the compound. The agitation may be effected mechanically or by refluxing. In any case, the mix is kept hot.

Proportions here and elsewhere herein are expressed as parts by weight unless elsewhere specifically stated to the contrary.

For liquid phase reaction, the temperatures used for dehydrohalogenation are generally in the range 50° to 200° C. When vapor-phase processes are employed, temperatures up to 300° C. may be satisfactory. The temperatures used in vapor-phase processes are generally higher than the boiling points of the dihalopropionic ester under normal pressures. However, for very high-boiling materials, lower temperatures may be used by reducing the pressure on the system to subatmospheric levels.

In general, the operation proceeds under anhydrous conditions, at the end at least. When water is present in the dihalopropionic ester or in the sulfonic acid, these may be dried before mixing or by heating during the course of the reaction.

In order to insure that premature polymerization of the product is kept to a minimum, it is desirable to add a conventional inhibitor to the reaction flask, distillation column, condenser and receivers. Prevention of polymerization may be effected by exclusion of light and by the addition of metallic copper, copper compounds, reduced sulfur compounds, hydroquinone, phenylene diamine, and the like.

The invention will be further illustrated by description in connection with the following specific examples of the practice of it.

*Example I*

To five parts of Amberlite IR–120 was added 100 parts of methyl alpha-beta-dichloropropionate and the mixture was heated in the presence of copper powder and hydroquinone as polymerization inhibitors. Hydrogen chloride was evolved and was allowed to escape. When the theoretical amount of hydrogen chloride had been formed, the residue was filtered, and the filtrate was distilled, yielding pure methyl alpha-chloroacrylate.

*Example II*

A glass tube was packed with 40 parts of Dowex 50–X8 ion exchange resin mixed with a small amount of copper powder and hydroquinone as polymerization inhibitor for the product expected. The packed tube was heated in a combustion chamber at 200°–250° C. One hundred parts of methyl alpha-beta-dichloropropionate was vaporized and passed through this tube slowly, so that approximately half the chlorine was removed as HCl. The distillate was condensed. The condensate was found to be a mixture of methyl alpha-chloroacrylate and methyl alpha-beta-dichloropropionate. The yield of methyl alpha-chloroacrylate based on the unrecovered methyl alpha-beta-dichloropropionate was 94%.

*Example III*

A vertical glass tube was packed with 25 parts of Amberlite IR–120 interspersed with a little copper powder and hydroquinone as inhibitors of polymerization of the expected product. The tube was wrapped with an electrical heating element. The column was heated to 100°–110° C. One hundred parts of methyl alpha-beta-dichloropropionate were then trickled slowly over the Amberlite. Hydrogen chloride was evolved and was removed from the top of the tube. The liquid which was collected at the bottom of the tube was transferred to a fractionating column operating under reduced pressure, whereupon pure methyl alpha-chloroacrylate was obtained as a distillate. The residue consisted essentially of unchanged methyl alpha-beta-dichloropropionate. This was rerun, by being returned to the top of the Amberlite resin column.

*Example IV*

One hundred parts of alpha-beta-dichloropropionic nitrile was mixed with 25 parts of para-toluenesulfonic acid and heated under atmospheric pressure in a distilling apparatus equipped with a distilling column. Hydrogen chloride gas was evolved and alpha-chloroacrylonitrile was obtained as a distillate.

*Example V*

One hundred parts of phenyl alpha-beta-dichloropropionate was mixed with 5 parts of naphthalene disulfonic acid, 1 part of powdered copper, and 0.1 of hydroquinone. This mixture was heated in a distilling apparatus equipped with a hydrogen chloride trap at 100°–150° C. until 16 parts of hydrogen chloride was collected. The residue consisted mainly of phenyl alpha-chloracrylate.

Example VI

Alpha-beta-dichloropropionic acid was mixed with 20% by weight of Amberlite IR-120 and heated under reduced pressure in a distilling apparatus, whereupon the theoretical amount of hydrogen chloride was given off, and alpha-chloroacrylic acid was obtained in a high yield as a distillate.

Example VII

Ethylene glycol alpha-beta-dichloropropionate was mixed with 10% by weight of Amberlite IR-120 and 0.1% of copper oxide. This mixture was heated in an apparatus designed to exclude light and to permit the escape of hydrogen chloride gas. Heating was continued until one molecular proportion of hydrogen chloride had been evolved. The residue was filtered and was found to consist essentially of ethylene glycol di-alpha-chloroacrylate.

Example VIII

One hundred parts of ethyl alpha-beta-dichloropropionate was mixed with chlorosulfonic acid, in an amount of 1% by weight, together with some copper powder and hydroquinone as polymerization inhibitors. On heating, evolution of hydrogen chloride gas began. Continued heating led to the appearance of ethyl alpha-chloroacrylate as a readily condensable distillate.

Example IX

The procedure of Example V is followed except that the naphthalene disulfonic acid there used as catalyst is replaced by methanesulfonic acid or by any one of the other sulfonic acids disclosed herein.

In a modification of this example, the proportion of the acid catalyst is increased to 25 parts for 100 parts of the mixture of the acid and dichloro compound to be dehydrohalogenated.

Example X

The procedure of Examples I-IX is followed except that the alpha-beta-dichloropropionate to be dehydrochlorinated is substituted by an equimolecular proportion of any homolog thereof listed earlier herein.

Example XI

The procedure of Examples I-X is followed except that the ester to be dehydrohalogenated is replaced by an equimolecular proportion of the ester of any of the other dichloro acids described herein, by the amide or acyl chloride of any of the dichloro acids, by the free acids themselves, or by the corresponding nitriles of which an example is alpha-beta-dichloropropionitrile. No change in the technique or method of operation is made over those used with the esters of the earlier examples.

It is noted in connection with the Examples X-XI, however, that the alpha-chloro products of these examples are adapted to undergo rapid polymerization, under standard conditions for polymerization of the alpha-chloroacrylic compounds, only when the said products contain a $CH_2$: group at the terminus of the molecular formula.

Products made as described are useful as monomers in the making of plastics or, in the cases of relatively non-reactive products, as raw materials for conversion by usual techniques to the esters of other polymerizable derivatives.

It is to be understood that it is intended to cover all changes and modifications of the examples of the invention herein chosen for the purpose of illustration which do not constitute departures from the spirit and scope of the invention.

The invention claimed is:

1. In making an alpha-chloroacrylic product, the process which comprises heating, at a temperature of 50°–300° C. and in substantially anhydrous condition, an alpha-beta dichloropropiono compound selected from the group consisting of propionic acid and the esters, amides, nitrile, and acid chloride thereof and a sulphonic acid compound selected from the group consisting of sulfonic acid resins and sulfonic acids and continuing the heating until approximately one molecule of hydrogen chloride is removed from the dichloro product used, the process giving the alpha-monochloro-2,3-unsaturated product corresponding essentially to the said compound originally selected less the chlorine in the beta position and less one hydrogen atom.

2. The process of claim 1 in which the sulfonic acid compound used is a sulfonic acid and the temperature of said heating is 50°–200° C.

3. The process of claim 1 in which the said heating is at the temperature of boiling of the mixture under the prevailing pressure and the hydrogen chloride is removed from the mixture as formed.

4. The process of claim 1 in which the said sulfonic acid compound is in the form of sulfonic acid resin granules, the said dichloro compound being passed continuously thereover at the temperature of 50°–300° C.

5. The process of claim 1 in which the said alpha-beta dichloro substitution product is methyl alpha-beta dichloropropionate, the said sulfonic acid compound is styrene-divinylbenzene copolymer sulfonic acid, the temperature of heating is 50°–300° C. and the product formed is methyl alpha-chloroacrylate.

6. The process of claim 1 in which the said compound is an ester of alpha-beta-dichloropropionic acid.

7. The process of claim 1 in which the said dehydrohalogenation agent is styrene-divinylbenzene copolymer sulfonic acid.

8. The process of claim 2 in which the said compound is alpha-beta-dichloropropionic acid.

9. The process of claim 1 in which the said compound is an amide of alpha-beta-dichloropropionic acid.

10. The process of claim 1 in which the said compound is the nitrile of alpha-beta-dichloropropionic acid.

11. The process of claim 1 in which the said compound is the acid chloride of alpha-beta-dichloropropionic acid.

12. In making an alpha-chloro substitution product, the process which comprises heating at 50°–200° C. 1–25 parts by weight of a sulfonic acid with an alkyl ester of alpha-beta-dichloropropionic acid in proportion to give a total of 100 parts with the said acid until approximately one molecule of hydrogen chloride is removed from the dichloropropionic ester.

References Cited in the file of this patent
UNITED STATES PATENTS

| | | |
|---|---|---|
| 1,934,613 | Jacobi et al. | Nov. 7, 1933 |
| 2,013,648 | Barrett | Sept. 10, 1935 |
| 2,245,547 | Pollack | June 10, 1941 |
| 2,400,464 | Lichty | May 14, 1946 |
| 2,434,229 | Saunders | Jan. 6, 1948 |
| 2,640,073 | Ney | May 26, 1953 |